United States Patent
Riedel et al.

(10) Patent No.: US 9,995,938 B2
(45) Date of Patent: *Jun. 12, 2018

(54) SPECTACLE LENS FOR A DISPLAY DEVICE THAT CAN BE FITTED ON THE HEAD OF A USER AND GENERATES AN IMAGE

(71) Applicant: Carl Zeiss Smart Optics GmbH, Aalen (DE)

(72) Inventors: Lisa Riedel, Jena (DE); Hans-Juergen Dobschal, Kleinromstedt (DE); Gerhard Kelch, Aalen (DE); Wolf Krause, Essingen (DE); Karsten Lindig, Erfurt (DE); Joerg Puetz, Aalen (DE); Momchil Davidkov, Aalen (DE); Manfred Maul, Aalen (DE); Diana Tonova, Aalen (DE); Georg Michels, Aalen (DE)

(73) Assignee: tooz technologies GmbH, Aalen (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/304,846

(22) PCT Filed: Apr. 16, 2015

(86) PCT No.: PCT/EP2015/058278
§ 371 (c)(1),
(2) Date: Oct. 17, 2016

(87) PCT Pub. No.: WO2015/158833
PCT Pub. Date: Oct. 22, 2015

(65) Prior Publication Data
US 2017/0192238 A1    Jul. 6, 2017

(30) Foreign Application Priority Data
Apr. 17, 2014 (DE) .......... 10 2014 207 499

(51) Int. Cl.
*G02B 27/14* (2006.01)
*G03H 1/00* (2006.01)
(Continued)

(52) U.S. Cl.
CPC ....... *G02B 27/0172* (2013.01); *G02B 6/0001* (2013.01); *G02B 2027/013* (2013.01);
(Continued)

(58) Field of Classification Search
CPC ............ G02B 27/0172; G02B 27/0101; G02B 27/0149; G02B 27/145; G02B 27/0103;
(Continued)

(56) References Cited

U.S. PATENT DOCUMENTS 5,712,721 A    1/1998  Large
9,223,147 B2   12/2015 Guillot et al.
(Continued)

FOREIGN PATENT DOCUMENTS

DE    102009013604 A1    9/2010
EP         1748305 A1    1/2007
(Continued)

OTHER PUBLICATIONS

International Preliminary Report on Patentability rendered by the International Bureau of WIPO for PCT/EP2015/058278, dated Oct. 27, 2016, 15 pages (including English translation).

*Primary Examiner* — Dawayne A Pinkney
(74) *Attorney, Agent, or Firm* — Skaar Ulbrich Macari, P.A.

(57) ABSTRACT

A spectacle lens for a display device can be fitted on the head of a user and generate an image. The spectacle lens can be constructed with several shells including an outer shell and an inner shell which is joined to the outer shell, wherein a curved channel shell, which includes a curved first reflecting surface and a curved second reflecting surface, is arranged (Continued)

between the outer and inner shell. The light guiding channel includes at least one section of the channel shell and the two reflecting surfaces on which the light bundles are reflected for guiding from the coupling-in section to the coupling-out section.

17 Claims, 6 Drawing Sheets

(51) Int. Cl.
  *G02F 1/1335* (2006.01)
  *G03B 21/26* (2006.01)
  *G09G 5/00* (2006.01)
  *G02C 1/00* (2006.01)
  *G02B 27/01* (2006.01)
  *F21V 8/00* (2006.01)

(52) U.S. Cl.
  CPC ............ *G02B 2027/0178* (2013.01); *G02B 2027/0194* (2013.01)

(58) Field of Classification Search
  CPC ......... G02B 27/01; G09F 19/18; G03B 21/00; G03B 21/14; G09G 3/003; A61B 3/103; A61B 3/14; A61B 3/113; A61B 3/1225
  USPC ...... 359/630–634, 13–14; 349/11; 310/49 R, 310/156.32, 156.33, 156.34, 156.35, 310/266–268, 156.02; 353/11–12, 28, 353/119; 345/7, 9; 351/200, 205–206, 351/210, 221; 340/438, 980, 995.1, 340/815.47, 815.74
  See application file for complete search history.

(56) References Cited

U.S. PATENT DOCUMENTS

| | | | |
|---|---|---|---|
| 2007/0008624 A1* | 1/2007 | Hirayama | G02B 27/0081 359/630 |
| 2007/0070859 A1 | 3/2007 | Hirayama | |
| 2012/0001833 A1* | 1/2012 | Lindig | G02B 27/017 345/8 |
| 2012/0057122 A1 | 3/2012 | Guillot et al. | |
| 2012/0229367 A1* | 9/2012 | Magyari | G02B 27/0172 345/8 |
| 2013/0200540 A1 | 8/2013 | Buchon et al. | |
| 2015/0260992 A1* | 9/2015 | Luttmann | G02B 27/0172 359/631 |
| 2016/0313557 A1* | 10/2016 | Schmidt | G02B 3/08 |

FOREIGN PATENT DOCUMENTS

| | | |
|---|---|---|
| FR | 2938934 A1 | 5/2010 |
| JP | 2004021078 A | 1/2004 |
| WO | 2004001484 A1 | 12/2003 |
| WO | 2009083977 A2 | 7/2009 |
| WO | 2011095379 A2 | 8/2011 |
| WO | WO2015044297 * | 4/2015 |

* cited by examiner

SPECTACLE LENS FOR A DISPLAY DEVICE THAT CAN BE FITTED ON THE HEAD OF A USER AND GENERATES AN IMAGE

PRIORITY

This application claims the benefit of German Patent Application No. 102014207499.1 filed on Apr. 17, 2014, which is hereby incorporated herein by reference in its entirety.

FIELD

The present invention relates to a spectacle lens for a display device that can be fitted on the head of a user and generates an image, wherein the spectacle lens comprises a curved front side and a curved rear side, a coupling-in section and a coupling-out section, spaced apart from the coupling-in section, as well as a light guiding channel, which is suitable for guiding light bundles of pixels of the generated image, which are coupled into the spectacle lens via the coupling-in section of the spectacle lens, in the spectacle lens to the coupling-out section, by which they are coupled out of the spectacle lens.

BACKGROUND

Because of the curved front and rear side, the production of a spectacle lens with a light guiding channel is difficult. In particular, the production of a light guiding channel which has the desired optical properties is technically difficult.

SUMMARY

An object of the invention is to provide a spectacle lens that can be produced easily.

The disclosure includes a spectacle lens constructed with several shells which comprises an outer shell and an inner shell joined to the outer shell, wherein a curved channel shell, which comprises a curved first reflecting surface and a curved second reflecting surface, is arranged between the outer and inner shell, wherein the light guiding channel comprises at least one section of the channel shell and the two reflecting surfaces on which the light bundles are reflected for the guiding from the coupling-in section to the coupling-out section.

Through this buried design of the two reflecting surfaces it can be ensured that the light bundles are guided well, even when the front and/or rear side of the spectacle lens is dirty. Furthermore, the spectacle lens can also be produced well since the first and second reflecting surfaces can be formed, for example, on the channel shell and the three shells can then be joined to each other. This simplifies the production process.

The curved channel shell can be joined to the outer shell via the curved first reflecting surface and to the inner shell via the curved second reflecting surface.

However, it is also possible for the curved first reflecting surface and/or the curved second reflecting surface to be formed in that an air gap is present between the channel shell and the outer shell and/or the inner shell. In this case, the reflection can take place through total internal reflection. The curved first or second reflecting surface is thus formed by the boundary surface of the channel shell to the air gap. The air gap is preferably only present in the area of the light guiding channel and the channel shell is preferably mechanically connected to the outer shell and/or the inner shell in areas next to the light guiding channel. This can be realized, e.g., by means of an optical cement or an optical adhesive.

In particular, the channel shell can be arranged between the outer and inner shell as a spacer shell, with the result that the outer and inner shell are not in direct contact. The channel layer is thus in contact with the outer shell over its whole surface via its first material boundary surface and is in contact with the inner shell over its whole surface via its second material boundary surface. A three-shell structure is thus present. Seen in top view onto the spectacle lens, the outer shell, the channel shell and the inner shell preferably have the same dimensions.

Furthermore, the first side of the outer shell facing away from the inner shell can form the front side of the spectacle lens and the first side of the inner shell facing away from the outer shell can form the rear side of the spectacle lens.

Furthermore, it is possible for the rear side to have a curvature which is chosen such that a correction of defective vision is brought about. This leads to the advantage that the desired correction of defective vision is also present for the coupled-out light bundles, as these are coupled out such that they exit the spectacle lens via the rear side of the inner shell.

The guiding of the light bundles can be optimized with respect to a desired imaging by means of the channel shell. Independently thereof, the desired correction of defective vision can be optimized by means of the inner shell. With the spectacle lens according to the invention, therefore, on the one hand the imaging properties can be designed and set via the channel shell, and on the other hand the correction of defective vision properties can be designed and set via the inner shell, independently of each other.

In addition, the coupling-out section can be part of the channel shell. This leads to a further simplification of the production of the spectacle lens according to the invention.

Furthermore, the inner shell, the channel shell and the outer shell can be formed from the same material. In this case, all three shells have the same refractive index. However, it is also possible for the channel shell to be formed from a different material from the inner and/or outer shell. In particular, all three shells can be formed from different materials.

Furthermore, the inner shell can be joined flat to the channel shell and the channel shell can be joined flat to the outer shell. The shells can, e.g., be bonded or cemented to each other.

The sides of the inner shell and channel shell as well as of the outer shell and channel shell which face each other are preferably formed complementary to each other. In particular, these sides which face each other can be spherically curved.

In addition, the front side and/or rear side can be spherically curved.

Through this multiple-shell structure, the thickness of the spectacle lens can be kept as small as possible. At the same time, the light guiding channel can be formed such that the desired good imaging properties can be ensured.

The coupling-out section can comprise several reflective deflecting surfaces arranged next to each other. The reflective deflecting surfaces can also be referred to as reflective facets. They can have a reflectivity of almost 100% and in this case be referred to as mirror surfaces. It is also possible for them to have a lower reflectivity and thus be formed partially transparent.

The reflective deflecting surfaces can in each case be formed flat or curved. Furthermore, the deflecting surfaces can reproduce a curved reflecting surface in a Fresnel manner which also has an imaging property in addition to a pure beam deflection.

The coupling-out section can be buried in the spectacle lens and thus spaced apart from the front and rear side. In particular, the coupling-out section can be formed on a material boundary surface of the channel layer or buried in the channel layer.

A phototropic layer can be formed on the front side. The phototropic layer can be formed as a passive layer or as an active layer.

The thickness of the channel shell can be greater in the area of the light guiding channel than in the remaining area. However, it is also possible for the channel shell to have a (substantially constant) thickness or for the thickness of the channel shell to decrease in the direction from the coupling-in section to the coupling-out section.

The distance between the two reflecting surfaces can decrease in the direction from the coupling-in section to the coupling-out section or it can be constant.

In addition, at least one of the two reflecting surfaces can have an imaging property. In particular, the imaging property can be lent by the curvature of the reflecting surface.

At least one of the two reflecting surfaces can comprise an interference layer system. The interference layer system can be formed from at least two different materials with different refractive indices. In particular, the interference layer system can comprise two, three, four or five different materials. The refractive indices of the materials can lie in the range of from 1.4 to 2.5 at a wavelength of 546 nm.

In particular, at least one of the two reflecting surfaces can be formed such that it is transmissive for an angle of incidence in the range of from 0° up to a predetermined first critical angle of less than 90° and is reflective for an angle of incidence greater than a predetermined second critical angle which is greater than or equal to the first critical angle. These transmission/reflection properties are preferably present for radiation from the visible wavelength range. The first critical angle can lie, e.g., in the range of from 30°-60°, preferably in the range of from 35°-45°. The second critical angle can, e.g., lie in the range of from 45°-65°, preferably in the range of from 50°-60°.

Furthermore, at least one of the two reflecting surfaces can be formed as partially reflective coating or as reflective coating (mirror layer). For this, a metallic coating can be used for example. A type of rear surface mirror is thus effectively present.

Furthermore, at least one of the two reflecting surfaces can be formed such that it reflects light with a first polarization state and transmits light with a polarization state which is orthogonal thereto. In this case, the light bundles are preferably generated in such a way that they have the first polarization state.

The coupling-in section can be formed in an edge area of the spectacle lens and the coupling-out section can be formed in a central area of the spectacle lens. The coupling-in can, for example, take place via the end face of the spectacle lens or via the rear side of the spectacle lens.

The inner shell, the channel shell and the outer shell can in each case be formed in one piece. However, it is also possible for the inner shell, the channel shell and/or the outer shell to be formed in several parts.

The disclosure also includes a display device including a holder that can be fitted on the head of a user, an image-generating module secured to the holder, which generates an image, and an imaging optical system secured to the holder, which comprises a spectacle lens according to one of the above claims and which, when the holder is fitted on the head of the user, images the generated image such that the user can perceive it as a virtual image.

The imaging optical system can comprise the spectacle lens as the only optical element. However, it is also possible for the imaging optical system to comprise, in addition to the spectacle lens, also at least one further optical element. In particular, the outer shell can be formed in one piece together with the at least one further optical element. Alternatively, it is possible for the outer shell to be joined to the at least one further optical element (e.g. through cementing or bonding). Furthermore, the at least one further optical element can be spaced apart from the outer shell.

The at least one further optical element can be e.g. a collimation optical system which is arranged between the spectacle lens and the image-generating module, with the result that the light bundles from the image-generating module can be coupled into the spectacle lens as collimated bundles.

Furthermore, the display device can comprise a control unit which actuates the image-generating module.

The image-generating module can in particular comprise a two-dimensional imaging system, such as e.g. an LCD module, an LCoS module, an OLED module or a tilting mirror matrix. The imaging system can comprise a plurality of pixels, which can be arranged e.g. in rows and columns. The imaging system can be self-luminous or not self-luminous.

The image-generating module can in particular be formed such that it generates a monochromatic or a multi-coloured image.

The display device according to the invention can comprise further elements known to a person skilled in the art which are necessary for its operation.

It is understood that the features named above and those yet to be explained below can be used not only in the stated combinations but also in other combinations or alone, without departing from the scope of the present invention.

Figure 1:
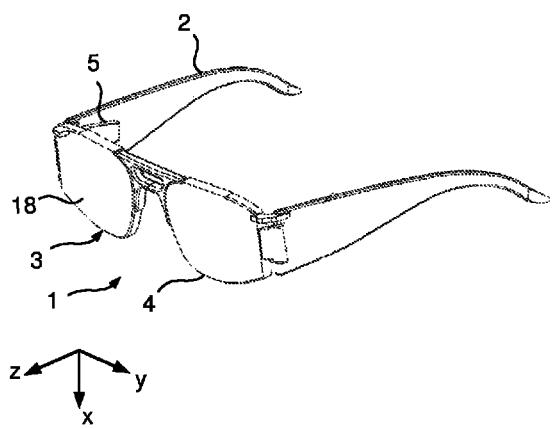
FIG. 1 is a schematic perspective representation of an example embodiment of the display device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3, 4 can be formed e.g. as sports glasses, sunglasses and/or glasses for correcting defective vision, wherein a virtual image can be reflected into the user's field of view via the first spectacle lens 3, as is described below.

For this, the display device 1 comprises an image-generating module 5, which can be arranged in the area of the right-hand temple stem of the holder 2, as is represented schematically in FIG. 1. The image-generating module 5 can comprise a two-dimensional image-generating element 6 (FIG. 2), such as e.g. an OLED, a CMOS or an LCoS chip or a tilting mirror matrix, with a plurality of pixels arranged e.g. in columns and rows.

The spectacle lenses 3 and 4, and in particular the first spectacle lens 3, are only described together with the display device 1 according to the invention by way of example. The spectacle lenses 3, 4, or at least the first spectacle lens 3, are in each case formed individually as a spectacle lens 3, 4 according to the invention or as an optical element according to the invention. The optical element according to the invention can also be used in another context than with the display device 1 described here. Therefore, the optical element, when it is formed as a spectacle lens, can, of course, also be formed as second spectacle lens 4.

Figure 2:
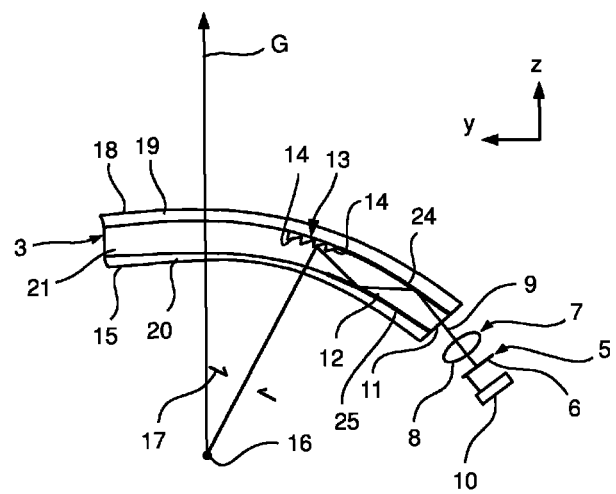
FIG. 2 is an enlarged partial sectional view of the first spectacle lens including a schematic representation of the image-generating module.

As can best be seen from the enlarged schematic partial sectional view in FIG. 2, the display device 1 comprises an imaging optical system 7 which contains an optical element 8 arranged between the image-generating element 6, or the imaging system 6, and the first spectacle lens 3. In addition, the first spectacle lens 3 itself also serves as part of the imaging optical system 7.

A light bundle 9 can emerge from each pixel of the imaging system 6. The desired image can be generated by correspondingly actuating the pixels of the imaging system 6 by means of a control unit 10, which can be part of the image-generating module 5. In FIG. 2, the beam path of a light beam is drawn in to represent the light bundles 9, with the result that the light beam 9 is also discussed below.

The light beam 9 emerging from the imaging system 6 runs through the optical element 8 and enters the first spectacle lens 3 via a coupling-in section 11 (here the end face of the first spectacle lens 3), and is guided in this along a light guiding channel 12 to a coupling-out section 13. The coupling-out section 13 comprises several reflective deflecting surfaces 14 (which can also be referred to as reflective facets) arranged next to each other on which a reflection of the light beams 9 takes place in the direction of a rear side 15 of the first spectacle lens 3, with the result that the light beams 9 exit the first spectacle lens 3 via the rear side 15.

Thus, when a user is wearing the display device 1 according to the invention on his head as intended, he can perceive the image generated by means of the imaging system 6 as a virtual image when he looks at the coupling-out section 13. In the embodiment described here, the user must look towards the right by approx. 40° relative to the direction of view G of a forward view. In FIG. 2, the centre of rotation 16 of the user's eye, as well as the eyebox 17 or the exit pupil 17 of the imaging optical system 7, is drawn in for clarification. The eyebox 17 is the area which is provided by the display device 1 and in which the user's eye can move and he can still always see the generated image as a virtual image.

Although in the described embodiment the coupling-in is carried out via the end face of the first spectacle lens 3 and thus the coupling-in section 11 is formed on the end face of the first spectacle lens 3, it is also possible to carry out a coupling-in via the rear side 15 of the first spectacle lens.

As is shown in the schematic representation in FIG. 2, both the rear side 15 and the front side 18 of the first spectacle lens 3 are formed curved.

Furthermore, as can be learned from the representation in FIG. 2, the first spectacle lens is formed with three shells and comprises an outer shell 19, an inner shell 20 and a channel shell 21 arranged between them.

The first side of the outer shell 19 facing away from the inner shell 20 forms the curved front side 18 of the first spectacle lens 3. The first side of the inner shell 20 facing away from the outer shell 19 forms the rear side 15 of the first spectacle lens.

To form the light guiding channel 12, a first reflecting surface 24 is formed between the channel shell 21 and the outer shell 19 and a second reflecting surface 25 is formed between the channel shell 21 and the inner shell 20. The two reflecting surfaces 24, 25 extend from the coupling-in section 11 to the coupling-out section 13. The light bundles 9 can thus be guided from the coupling-in section 11 to the coupling-out section 13 by reflection on the reflecting surfaces 24 and 25, with the result that they can then be coupled out via the rear side 15 of the first spectacle lens after reflection on the reflective deflecting surfaces 14.

The first and second reflecting surface 24 and 25 can e.g. be formed on the channel shell 21. However, it is also possible for the first reflecting surface to be formed on the outer shell 19 and for the second reflecting surface to be formed on the inner shell 20. As is indicated in FIG. 2, the inner shell 20 and the channel shell 21 on the one hand and the channel shell 21 and the outer shell 19 on the other hand are in each case in flat contact with each other. They can, e.g., be bonded or cemented to each other. It can therefore also be said that, in the area of the light guiding channel 12, the channel shell 21 is joined to the outer shell 19 via the first reflecting surface 24 and that, in the area of the light guiding channel 12, the channel shell 21 is joined to the inner shell 20 via the second reflecting surface 25.

The first and/or second reflecting surface 24 and 25 can e.g. be a partially reflective coating or a reflective coating (mirror layer). For this, a metallic coating can be used for example. However, it is also possible to use a coating which is reflective for a first polarization state and is transmissive for a polarization state orthogonal thereto. In this case, the light bundles 9 then have the first polarization state, with the result that the guiding in the light guiding channel 12 is ensured.

In addition, it is possible for the first and/or second reflecting surface 24 and 25 to be formed as interference layer system which comprises alternate thin layers with higher and lower refractive index. In the general case, the interference layer system can be formed from k optical layers $S_1, S_2, \ldots S_k$ (k>2) made of m materials $M_1, M_2, \ldots M_m$ (m>2), which differ in terms of their refractive indices $N_1, N_2, \ldots N_m$ (m>2). The refractive indices can lie e.g. in the range of from 1.4-2.5 at a wavelength of 546 nm. Such interference layer systems are known in principle to a person skilled in the art and can be optimized with respect to the desired optical properties. In the embodiment present here, the interference layer systems are optimized with respect to the visible spectral range such that they are transmissive for an angle of incidence α of from 0° to approx. 35° (practically 100% of the incident light is transmitted) and are reflective for an angle of incidence α in the range of from 50° to 90° (almost 100% reflectivity). In the transition area from 30° to 50°, the transmittance changes from 100% to 0%.

Figure 3:
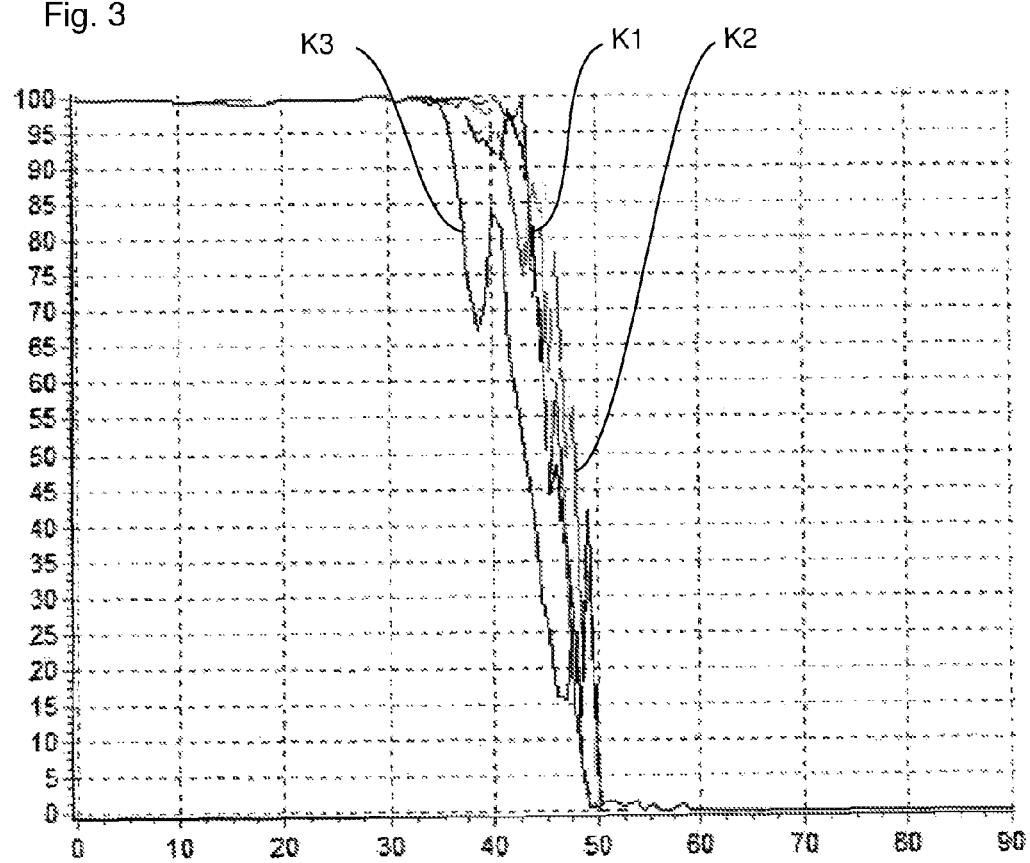
FIG. 3 is a representation of the transmissivity/reflectivity in dependence on the angle of incidence.

In FIG. 3, the transmissivity is shown along the y-axis in % against the angle of incidence α in ° along the x-axis. Curve K1 shows the transmission or reflection behaviour of the layer system for radiation with a wavelength of 400 nm. Curve K2 shows the behaviour for radiation with a wavelength of 450 nm and curve K3 shows the behaviour for radiation with a wavelength of 680 nm.

Figure 4:
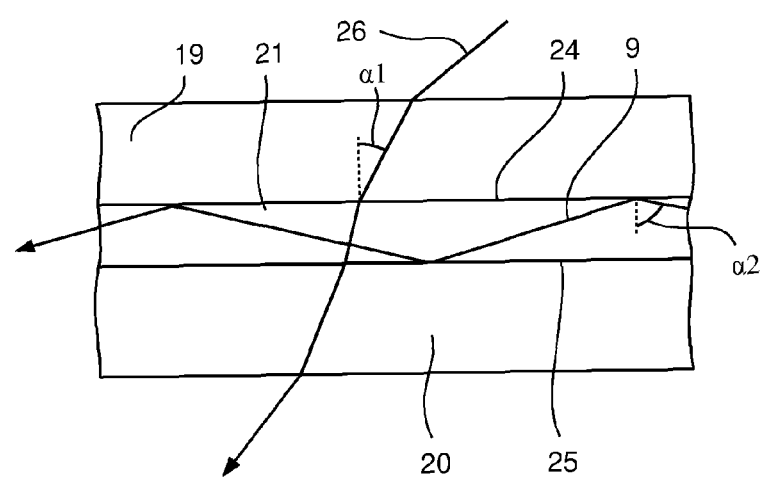
FIG. 4 is a schematic representation to explain the angle dependence of the reflecting surfaces.

In FIG. 4, this behaviour is represented again schematically. The light bundles 9 strike the corresponding reflecting surface 24 and 25 at an angle of incidence α2 of greater than 50° (relative to the perpendicular of the corresponding reflecting surface 24, 25) and are therefore reflected. In contrast, ambient light 26 strikes the reflecting surface 24, 25 at an angle of incidence α1 of less than 35° and is thus transmitted.

Figure 5:
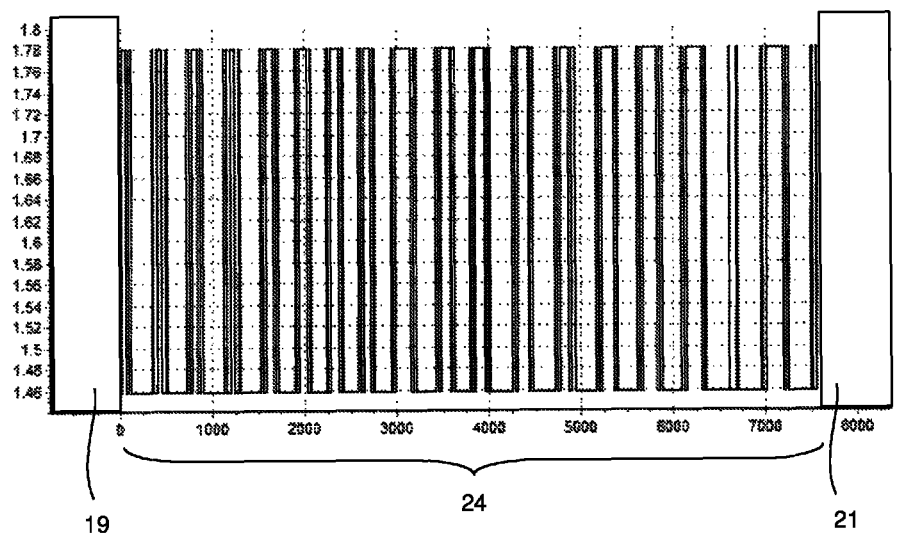
FIG. 5 is a representation which shows the layer sequence and the layer thicknesses of the interference layer system for the second reflecting surface.

In the embodiment example described here in connection with FIGS. 3 and 4, it was assumed that the inner shell 20, the channel shell 21 and the outer shell 19 in each case have a refractive index of 1.81. Two different materials with refractive indices $N_1=1.787$ and $N_2=1.459$ are used for the interference layer system, wherein k is 113. In FIG. 5, the corresponding structure of the second reflective layer 24 is shown schematically, wherein the thickness of the layer in nm is plotted along the x-axis (horizontal axis) and the refractive index is plotted along the y-axis (vertical axis).

Of course, the second reflecting surface 25 can be formed as an interference layer system according to FIG. 5 in the same way as the first reflecting surface 24.

Figure 6:
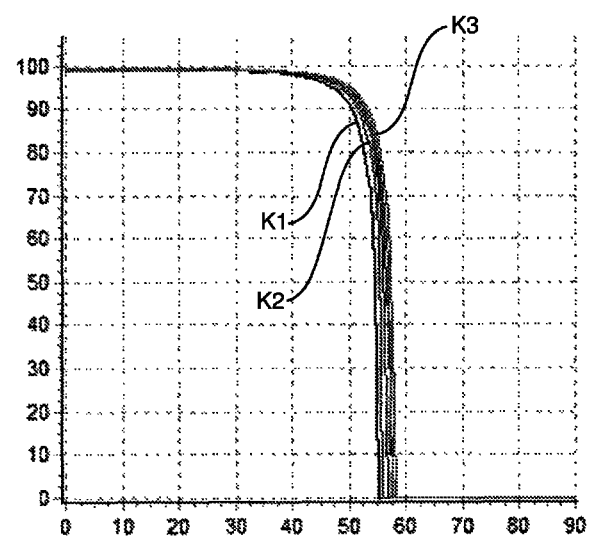
FIG. 6 is the transmission behaviour between channel shell and outer shell without additional reflecting surface.

If the refractive index of the channel shell 21 is greater than the refractive indices of the inner and outer shell 20, 19, total internal reflection can occur from a predetermined critical angle. If, e.g., the refractive index of the channel layer 21 is 1.81 and the refractive indices of the inner and outer shell 20, 19 are in each case 1.519, the critical angle is approx. 58°. The corresponding transmission behaviour is shown schematically in FIG. 6, wherein the angle of incidence in ° is plotted along the x-axis (horizontal axis) and the transmissivity in % is plotted along the y-axis (vertical axis). In this representation, the curves K1, K2 and K3, which show the behaviour for the wavelengths 400 nm, 450 nm and 680 nm, are indicated in the same way as in FIG. 3.

Figure 7:
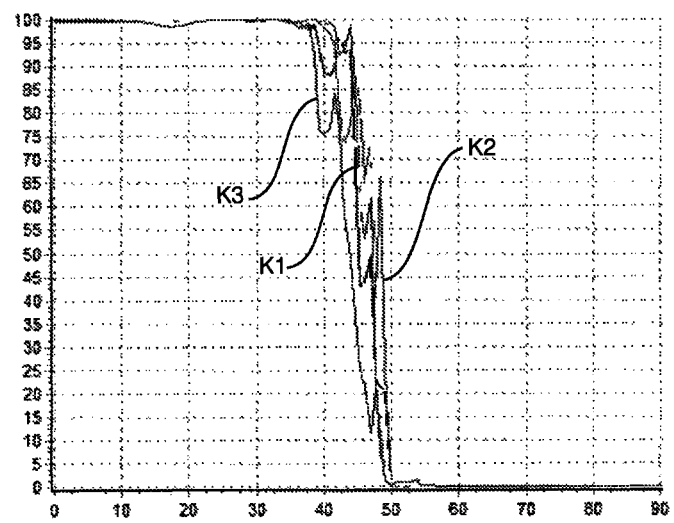
FIG. 7 is the transmission behaviour between channel shell and outer shell with additional reflecting surface.

If an interference layer system with two materials with the refractive indices 1.787 and 1.459 with 113 layers is now provided, the transmission behaviour shown in FIG. 7 can be achieved. The representation in FIG. 7 corresponds to the representation in FIG. 6. The transmission behaviour for the wavelengths 400 nm (curve K1), 450 nm (curve K2) and 680 nm (curve K3) is also drawn in. From the comparison of the representation in FIGS. 6 and 7 it can be learned that light guiding by reflection on the interference layer system is provided up to an angle of incidence of 50° and thus by 8° more than without an interference layer system.

Figure 8:
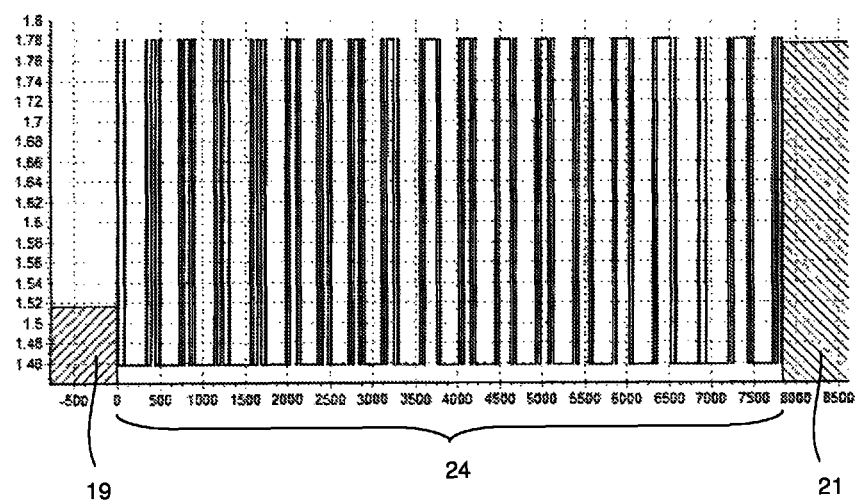
FIG. 8 is the layer structure of the reflecting surface according to the embodiment from FIG. 7.

In FIG. 8, the structure of the corresponding interference layer system is represented in the same way as in FIG. 5.

Figure 9:
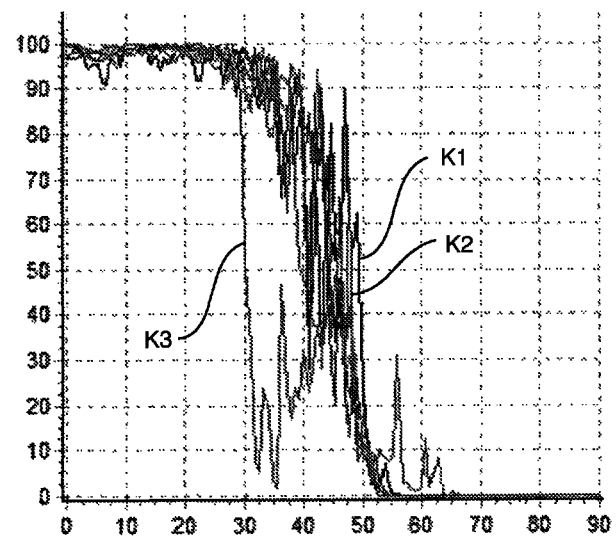
FIG. 9 is the transmission behaviour of a further example embodiment of the reflecting surface in a spectacle lens according to the invention.

In a further embodiment, the interference layer system can comprise three different materials with the refractive indices 1.787, 1.459 and 2.472 and can be arranged between an outer shell 19 and a channel shell 21 which are formed in each case from a material with the refractive index 1.62. In a layer system with 263 layers for the interference layer system, the transmission behaviour shown in FIG. 9 can be achieved. The representation in FIG. 9 corresponds to the representation in FIG. 7. The transmission behaviour for the wavelengths 400 nm (curve K1), 450 nm (curve K2) and 680 nm (curve K3) is drawn in in each case.

Figure 10:
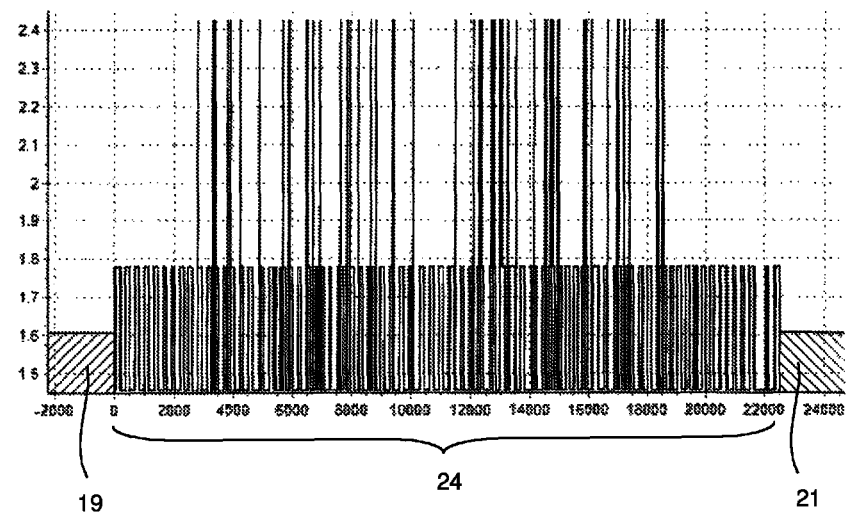
FIG. 10 is the layer structure of the reflecting surface of the embodiment according to FIG. 9.

In FIG. 10, the layer structure is represented in the same way as in FIG. 8.

Through the described three-shell structure of the first spectacle lens 3, the advantage is achieved that the guiding of the light bundles 9 in the light guiding channel 12 is independent of the cleanliness of the front and/or rear side 18, 15 of the first spectacle lens. Thus, any dirtiness on the front side 18 and/or the rear side 15 does not lead to any impairment in the guiding of the light bundles 9 from the coupling-in section 11 to the coupling-out section 13.

In addition, the rear side 15 can comprise a curvature with which a user's defective vision can be corrected. Thus, in an advantageous manner, the correction of the defective vision can be carried out via the inner shell 20 and the light guiding can be carried out via the channel shell 21, with the result that the correction of the defective vision on the one hand and the light guiding on the other hand can be optimized optically independently of each other. In an advantageous manner, the same channel shell 21 can always be used in order to adapt to different vision defects. For this, only an individual inner shell 20 needs to be provided and joined to the channel shell 21.

Furthermore, a phototrophic layer can be applied to the front side 18. Such a phototropic layer can be formed as a passive or as an active layer. Thus a design of the spectacle lens according to the invention can be realized as a spectacle lens for sunglasses for example.

Furthermore, the user will advantageously perceive the coupled-out image via the rear side 15 which is adapted to him, with the result that he can perceive the virtual image clearly despite his defective vision.

In the embodiment shown in FIG. 2, the thickness of the channel layer 21 is substantially constant.

However, it is also possible for the thickness of the channel layer to decrease in particular in the area of the light guiding channel 12 in the direction from the coupling-in section 11 to the coupling-out section 13.

Figure 11:
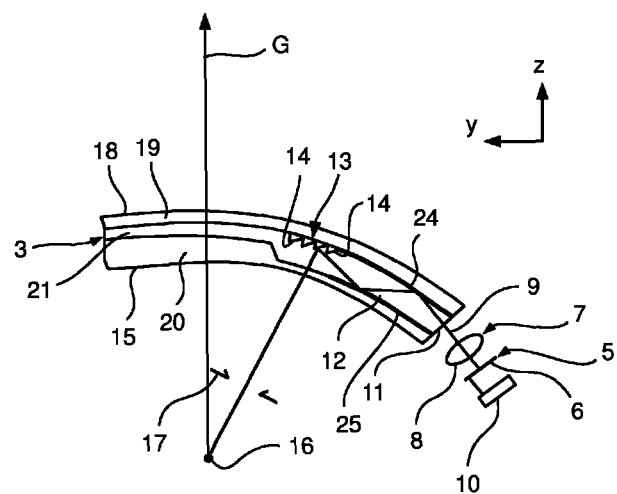
FIG. 11 is an enlarged partial sectional view of a further example embodiment of the first spectacle lens including a schematic representation of the image-generating module.

In particular, the thickness of the channel layer 21 can be less in the areas next to the light guiding channel 12 than in the area of the light guiding channel 12. Such a design is represented in FIG. 11.

In the embodiments described previously, the channel shell 21 extends over the whole of the first spectacle lens 3. In this case, the channel shell 21 can also be referred to as spacer shell since it always lies between inner shell 20 and outer shell 19, with the result that the inner shell 20 is never in direct contact with the outer shell 19.

Figure 12:
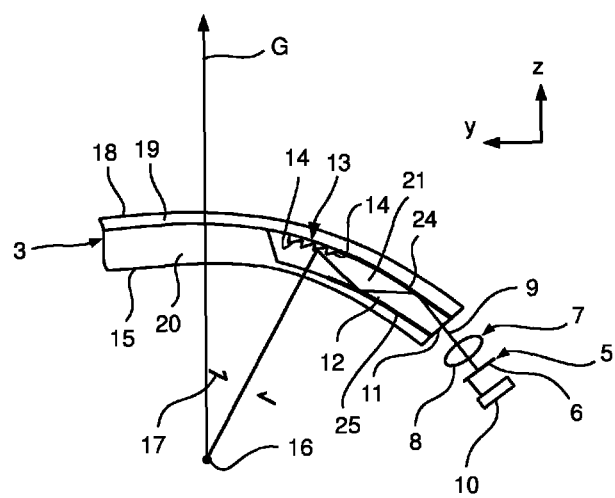
FIG. 12 is an enlarged partial sectional view of a further example embodiment of the first spectacle lens including a schematic representation of the image-generating module.

It is also possible, however, for the channel shell 21 not to extend over the whole of the spectacle lens. In particular, the channel shell 20 may only extend in the area of the light guiding channel 12. In this case, there can be direct contact between inner shell 20 and outer shell 19 in the other areas in which the channel shell 21 is not available, as is represented in FIG. 12.

The front and rear side 18, 15 can in each case be spherically curved. The rear side 15 can also comprise an aspherical curvature. Furthermore, the two boundary surfaces of the channel shell 21 can also be spherically curved. In particular, the curvatures of the sides of the corresponding shells 19, 20 and 21 which are opposite each other are chosen to be complementary, with the result that a flat contact can be produced.

The material of the outer shell 19, inner shell 20 and channel shell 21 is preferably the same material, with the result that there is the same refractive index. However, a material with a different refractive index can also be chosen for the individual shells 19-21.

In the display device 1 according to the invention, the reflection of the virtual image into the user's field of view takes place via the first spectacle lens 3. Of course, a reflection via the second spectacle lens 4 is also possible. In addition, the display device 1 can be formed such that items of information or virtual images are reflected via both spectacle lenses 3, 4. The reflection can take place such that a three-dimensional image impression results. However, this is not absolutely necessary.

The spectacle lenses 3, 4 can have a refractive power of zero or a refractive power different from zero (in particular to correct vision defects). As is shown in the figures, both the front side 11 and the rear side 12 of the spectacle lens 3 are formed curved. In particular, the front side 11 can be spherically curved. If the spectacle lens has a refractive power different from zero, in order to correct defective vision, as a rule the curvature of the rear side 15 is chosen appropriately in order to achieve the appropriate correction. The rear side 15 can have a curvature which deviates from the spherical form.

The holder 2 does not have to be formed as a spectacles-type holder. Any other type of holder with which the display device can be fitted or worn on the head of the user is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for a display device that can be fitted on the head of a user and generate an image, the spectacle lens comprising:
    a curved front side and a curved rear side;
    a coupling-in section;
    a coupling-out section spaced apart from the coupling-in section;
    a light guiding channel configured to guide light bundles of pixels of the generated image, which are coupled into the spectacle lens via the coupling-in section of the spectacle lens, in the spectacle lens to the coupling-out section, by which they are coupled out of the spectacle lens,
    an outer shell comprising a first material;
    an inner shell comprising a second material which is joined to the outer shell; and
    a curved channel shell comprising a third material, which is arranged between the outer and inner shell, the curved channel shell further comprising a curved first reflecting surface and a curved second reflecting surface,
    wherein the light guiding channel comprises at least one section of the curved channel shell and the first and second reflecting surfaces on which the light bundles are reflected for guiding from the coupling-in section to the coupling-out section.

2. The spectacle lens according to claim 1, wherein the curved channel shell is joined to the outer shell via the curved first reflecting surface and to the inner shell via the curved second reflecting surface.

3. The spectacle lens according to claim 1, wherein the channel shell is disposed between the outer and inner shells to form a spacer shell such that the outer and inner shells are not in direct contact with one another.

4. The spectacle lens according to claim 1, wherein a first side of the outer shell facing away from the inner shell forms the front side of the spectacle lens, and a first side of the inner shell facing away from the outer shell forms the rear side of the spectacle lens.

5. The spectacle lens according to claim 1, wherein the rear side has a curvature such that a correction of defective vision is provided.

6. The spectacle lens according to claim 1, wherein the coupling-out section is part of the channel shell.

7. The spectacle lens according to claim 1, wherein the inner shell, the channel shell and the outer shell each comprise the same material.

8. The spectacle lens according to claim 1, wherein the inner shell is joined flat to the channel shell, and the channel shell is joined flat to the outer shell.

9. The spectacle lens according to claim 1, wherein the coupling-out section comprises several reflective deflecting surfaces arranged adjacent to each other.

10. The spectacle lens according to claim 1, wherein the coupling-out section is buried in the spectacle lens and is spaced apart from both the front side and the rear side.

11. The spectacle lens according to claim 1, wherein a phototropic layer is disposed on the front side.

12. The spectacle lens according to claim 1, wherein the thickness of the channel shell is greater in an area of the light guiding channel than in an area other than the area of the light guiding channel.

13. The spectacle lens according to claim 1, wherein a distance between the first and second reflecting surfaces decreases in the direction from the coupling-in section to the coupling-out section.

14. The spectacle lens according to claim 1, wherein at least one of the first and second reflecting surfaces has an imaging property.

15. The spectacle lens according to claim 1, wherein at least one of the first and second reflecting surfaces comprises an interference layer system.

16. The spectacle lens according to claim 1, wherein at least one of the first and second reflecting surfaces is configured such that it is transmissive for an angle of incidence in the range of 0° up to a predetermined first critical angle of less than 90° and is reflective for an angle of incidence greater than a predetermined second critical angle, wherein the second critical angle is greater than or equal to the first critical angle.

17. A display device, comprising:
a holder configured to be fitted on the head of a user;
an image-generating module secured to the holder, which is configured to generate an image; and
an imaging optical system secured to the holder, which comprises a spectacle lens according to claim 1 and which, when the holder is fitted on the head of the user, is configured to image the generated image such that the user can perceive the generated image as a virtual image.

* * * * *